United States Patent [19]

Barton et al.

[11] Patent Number: 6,016,123

[45] Date of Patent: *Jan. 18, 2000

[54] BASE STATION ANTENNA ARRANGEMENT

[75] Inventors: Paul Barton, Torquay; Jeffrey Graham Searle, Nr Brixham; Peter John Chrystie, Brixham; Keith Russell Edwards, Paignton, all of United Kingdom

[73] Assignee: Northern Telecom Limited, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/880,299

[22] Filed: Jun. 24, 1997

Related U.S. Application Data

[63] Continuation of application No. 08/385,911, Feb. 9, 1995, abandoned.

[30] Foreign Application Priority Data

Feb. 16, 1994 [GB] United Kingdom .................. 9402942

[51] Int. Cl.[7] .............................. H01Q 3/22; H01Q 3/24; H01Q 3/26
[52] U.S. Cl. .......................... 342/373; 342/374; 455/422
[58] Field of Search .................................... 342/372, 373, 342/374; 455/422, 430

[56] References Cited

U.S. PATENT DOCUMENTS

| 4,211,894 | 7/1980 | Watanabe et al. . | |
| 4,759,051 | 7/1988 | Han . | |
| 5,079,557 | 1/1992 | Hopwood et al. | 342/373 |
| 5,274,844 | 12/1993 | Harrison et al. | 455/25 |
| 5,280,472 | 1/1994 | Gilhousen et al. | 370/18 |
| 5,428,817 | 6/1995 | Yahagi | 455/33.3 |
| 5,437,055 | 7/1995 | Wheatley, III | 455/33.3 |
| 5,448,753 | 9/1995 | Ahl et al. | 455/33.1 |
| 5,603,089 | 2/1997 | Searle et al. | 455/53.1 |
| 5,619,503 | 4/1997 | Dent | 370/330 |

FOREIGN PATENT DOCUMENTS

| 0252884 | 3/1988 | European Pat. Off. | G01S 7/02 |
| 2084807 | 1/1982 | United Kingdom | H01Q 3/36 |

OTHER PUBLICATIONS

Personal and Mobile Radio Communications Conference, 1991, Warwick pp. 272–279—Swales and Beach 'A Spectrum Efficient Cellular Base Station Antenna Architecture'—pp. 276–278; Figs. 10,11.

Proceedings of the Mediterrean Ekectrotechnical Conference Melecon '89 Apr. 1989, Lisboa. pp. 493–496—Bartolucci et al. 'Single Antenna Receivers for Advanced Satellite T/R Systems'—pp. 494–496; Figs. 2–6.

BBC Research Department Report., No. 6, Jul. 1988, Tadworth GB pp. 1–14 Maddocks 'A Flat–Plate Antenna for DBS Reception' p. 4, para 3.2 p. 5; Figs. 3,5.

Transactions of the Institute of Electronics, Information and Communication Engineers of Japan, vol. E74, No. 6, Jun. 1991, Tokyo JP pp. 1547–1555 Yamada et al. 'Base and Mobile Station Antennas for Land Mobile Radio Systems'.

*Primary Examiner*—Theodore M. Blum
*Attorney, Agent, or Firm*—Lee, Mann, Smith, McWilliams, Sweeney & Ohlson

[57] ABSTRACT

An antenna arrangement (10) for a cellular radio base station is provided with a plurality of r.f. transceivers, including one or more antenna arrays (12) each comprising a plurality of sub-arrays (20) each selectively operpable to form a beam in azimuth. Each sub-army is provided with elevation beamforming means (24) and individual transmit and receive amplifiers (30,32). Each sub-array beamformer is coupled to at least one r.f. transmitter feed (26)nd each r.f. receiver feed is coupled to at least two sub-array beamformers, the sub-arrays of each antenna array together forming a multiplicity of separate substantially coincident beams in azimuth. A method of operation is also disclosed.

10 Claims, 2 Drawing Sheets

BASE STATION ANTENNA ARRANGEMENT

This application is a continuation of Ser. No. 08/385,911 filed Feb. 9, 1995 now abandoned.

FIELD OF THE INVENTION

This invention relates to a base station antenna arrangement, for use in a cellular radio communications system.

BACKGROUND ART

Cellular radio systems are currently in increasing use throughout the world, providing telecommunications to mobile users. In order to meet the capacity demand, within the available frequency band allocation, cellular radio systems divide a geographic area to be covered into cells. Each cell is served by a base station through which the mobile stations communicate. The available communication channels are divided between the cells such that the same group of channels are reused by certain cells. The distance between the reused cells is planned such that the co-channel interference is maintained at a tolerable level.

When a new cellular radio system is initially deployed, operators are often interested in maximising the uplink (mobile station to base station) and downlink (base station to mobile station) range. The ranges in many systems are uplink limited due to the relatively low transmitted power levels of hand portable mobile stations. Any increase in range means that fewer cells are required to cover a given geographic area, hence reducing the number of base stations and associated infrastructure costs.

The antenna used at the base station site can potentially make significant improvements to the range and capacity of a cellular radio system. This invention provides a sectored antenna system that combines high Effective Isotropic Radiated Power (EIRP) with high reliability at low cost.

In a known antenna arrangement a single array of antenna elements or several antennas are coupled via beamformers and combiners to a plurality of r.f. transceivers whereby a number of calls are handled simultaneously sharing the same antenna beam. One example of such an arrangement is discussed in a paper presented by S C Swales and M A Beach at the Personal and Mobile Radio Communications Conference, 1991, Warwick. The use of such a system leads to losses within the beamforming and combining means. Further, all the antenna elements/antennas must be capable of handling the combined power of all of the amplifiers which affects both the mean and peak power rating.

SUMMARY OF THE INVENTION

In accordance with the invention, there is provided an antenna arrangement for a cellular radio base station comprising at least one antenna array including several antenna sub-arrays each selectively operable to form a beam in azimuth wherein the uplink signals are received by at least two sub-arrays coupled to the base station controller by respective elevation beamformers. This arrangement provides a simple means of increasing the gain of received signals. Furthermore, this provides the advantage of a lossless, broadband space combination of the RF carriers. The use of multiple sub-arrays enables a plurality of diverse receive paths to be obtained directly from the antenna array.

Preferably, the downlink is carried at least one sub-array, each sub-array being coupled to the base station controller by respective elevation beamformers. By utilising a number of low power signals, the maximum effective isotropic power may be achieved without resorting to large signal amplifiers, with attendant power reduction and weight reduction at the masthead. A further advantage is that, in using one transmit path per sub array, losses due to combiners are reduced, when signal traffic is low.

In one embodiment, diplexer means are provided whereby each sub-array is coupled to a respective transmit and receive amplifying means. In a further embodiment, separate sub-arrays are utilised for uplink and downlink communications respectively, the individual amplifyimg means for each transmit sub-array comprising a number of low power single carrier amplifiers distributed in the sub-array elevation beamforming means. This is beneficial in that fewer intermodulation products are generated and the power requirements are reduced.

According to another aspect of the present invention there is provided an antenna arrangement for a cellular radio base station provided with a plurality of r.f. transceivers each for transmitting and receiving r.f. signals to and from the antenna via respective transmit and receive feed means for one or more calls, the arrangement including one or more antenna arrays wherein each array comprises a plurality of sub-arrays each selectively operable to form a beam in azimuth, elevation beamforming means for each sub-array and individual transmit and receive amplifying means for each sub-array, wherein each sub-array beamforming means is coupled to at least one r.f. transmitter feed means and each r.f. receiver feed means is coupled to at least two sub-array beamforming means, the sub-arrays of each antenna array together forming a multiplicity of separate substantially coincident beams in azimuth.

According to a further aspect of the present invention there is provided a method of operating an antenna arrangement for a cellular radio base station in a receive mode, wherein the base station comprises at least one antenna array including several antenna sub-arrays each selectively operable to receive a beam in azimuth, wherein the method comprises the steps of: receiving radio signals from mobile transmitters using at least two sub-arrays coupled to a base station controller; feeding the signals to single carrier amplifiers, whereby a plurality of diverse receive paths can be obtained directly from the antenna array.

According to a still further aspect of the present invention there is provided a method of operating an antenna arrangement for a cellular radio base station in a transmit mode wherein the base station comprises at least one antenna array including several antenna sub-arrays each selectively operable to form a beam in azimuth, wherein the downlink signals are transmitted by at least one sub-array selectively coupled to a base station controller by respective elevation beamformers, the method comprising the steps of i) providing a signal to be transmitted by a base station control means to an r.f. generator to produce an r.f. signal; ii) transmitting said r.f. signal via a feed to a selected transmit amplifier; iii) transmitting said r.f. signal to a beamforming means; and iv) feeding the sub-array elements of selected sub-array. If only one sub-array is selected, then only a single carrier is utilised to carry the signal.

DESCRIPTION OF THE DRAWINGS

Embodiments of the invention will now be described with reference to the accompanying drawings, in which.

Figure 1:
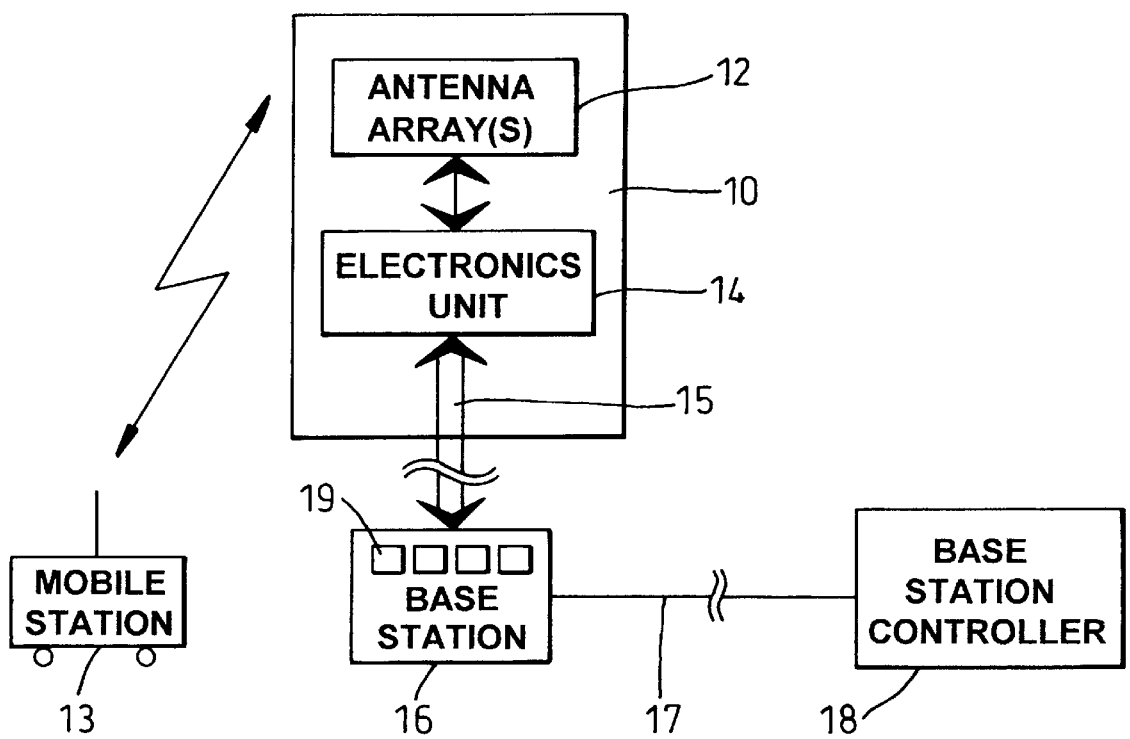
FIG. 1 is a block diagram of the main elements of a base station.

The main elements of a base station as shown in FIG. 1 comprise a mast, tower or building 10 supporting antenna array(s) 12 and an associated antenna electronics unit 14, which includes diplexers and amplifiers. The antenna electronics unit 14 is connected via feeder cables 15 to the base station 16 which is under the control of a base station controller 18 with which it communicates via a microwave link or land link 17. The base station 16 is provided with a number of r.f. transceivers 19 responsible for transmitting and receiving calls handled by the antenna array(s). A representation of a mobile station 13 is also depicted.

Figure 2:
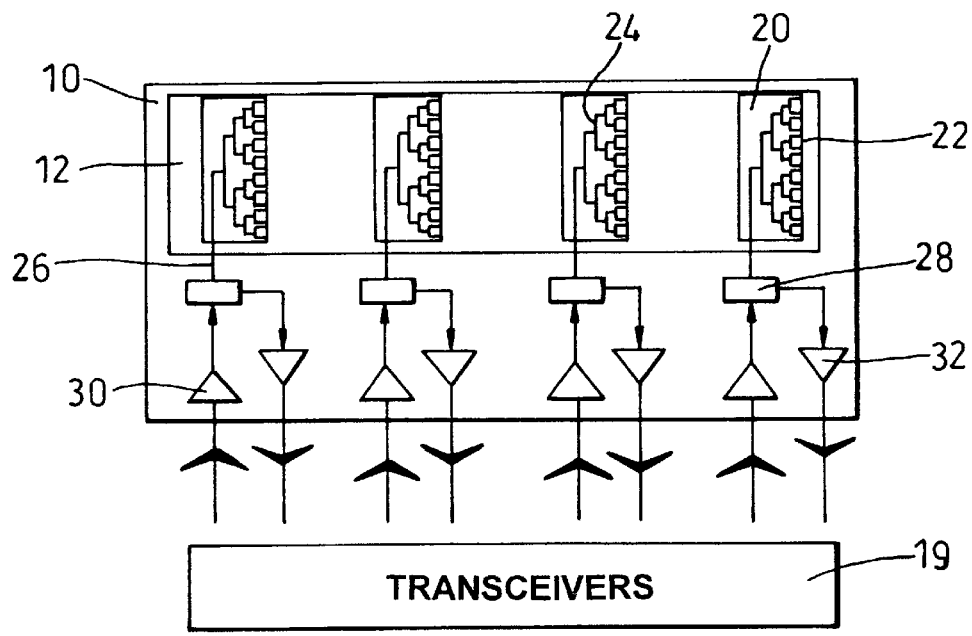
FIG. 2 is a diagram of a first embodiment of a multiple sub-array antenna with separate transmit power amplification and receive low noise amplification for each sub-array.

The detailed constituents of the first embodiment are shown in FIG. 2. Only one of the antenna arrays is depicted. Each antenna array 12 comprises multiple sub-arrays 20 with each sub-array formed by a conventional column of individual antenna elements 22. The elements of each column sub-array are coupled via a beamforming network 24 to a single feed 26 for the sub-array. The amplitude and phase relationships imposed on the r.f. signals from and to the single feed by the beamformer network determine the elevation beam pattern of the antenna sub-array for both transmit and receive.

The transmit and receive signals for each elevation beamformer are coupled to the beamformer via a diplexer 28. Filters that cover just the transmit or receive frequency bands respectively can be used for this purpose. In the transmit path the diplexers 28 are fed from a respective individual single carrier power amplifier 30. These amplify the r.f. signals up to the power levels required for transmission. In the receive path the diplexers 28 feed separate substantially identical low noise amplifiers 32. The low noise amplifiers are required to amplify the weak received r.f. signals prior to any system losses to establish a low noise figure (high sensitivity) in the subsequent receive path. In a preferred embodiment the outputs of two or more of the receive amplifiers are combined, foe example in combiners 32a, to provide the maximum amount of gain for receiving weak signals from mobile equipment.

Figure 3:
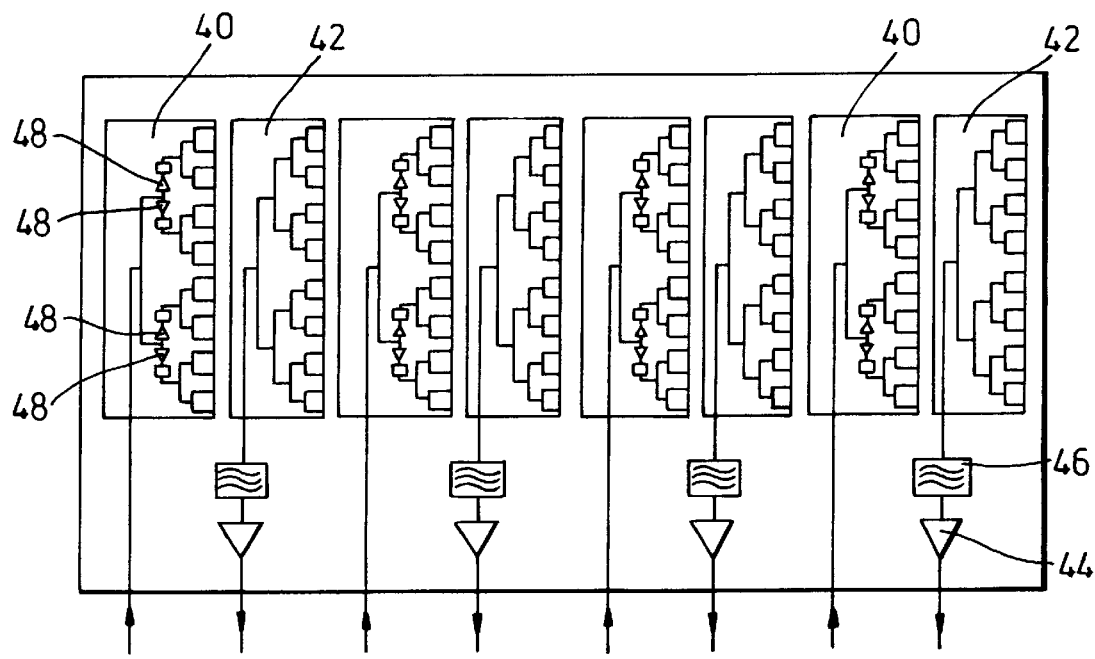
FIG. 3 is a diagram of a second embodiment of a multiple sub-array antenna having separate transmit and receive sub-arrays with distributed transmit power amplification for each transmit sub-array.

The detailed constituents of the second embodiment are shown in FIG. 3. In this instance separate antenna sub-arrays 40 and 42 are required for transmit only and receive only respectively. The receive only sub-arrays 42 are substantially the same as the combined transmit/receive sub-arrays used in FIG. 2 except that each sub-array feeds a respective low noise amplifier 44 via a respective filter 46, covering the receive band, instead of the diplexer. On the transmit side the single carrier high power amplifier prior to the sub-array feed 26 of FIG. 2 is now replaced by multiple single carrier low power amplifiers 48, incorporated into the branches of the sub-array beamformer feeding the sub-array elements.

Other features of the invention can now be considered in more detail and contrasted with the conventional sectorised antenna. It is not a single feature of the invention but rather the overall architecture (the functions and their precise disposition) which provides a practical and economic realisation of the antenna array.

A significant feature of this antenna architecture is the use of separate column sub-arrays which provides several advantages over conventional planar arrays. Both the arrangements of FIG. 2 and FIG. 3 offer the advantage of lossless, broadband space combination of the RF carriers. The arrangement in FIG. 2 offers more precise control of the elevation beam shape and fewer columns since each is used for both transmit and receive. The arrangement in FIG. 3 is potentially more reliable in that it uses lower power distributed amplifiers with only a gradual degradation in overall performance in the case of individual amplifier failure.

The use of multiple linear sub-arrays enables a plurality of diverse receive paths to be obtained directly from the antenna array. The number of sub-arrays required can be tailored, according to the level of diversity that can be accommodated by the rest of the system. Should this result in more sub-arrays than there are transmitters to be supported by each antenna array, then the transmit side can be depopulated as necessary. Multiple diverse receive paths can be combined in several ways each of which adds varying amounts of diversity gain to improve the uplink. Moreover, it is not necessary that all the sub-arrays are employed, since the use of two sub-arrays would provide a minimum level of receive diversity.

Figure 4:
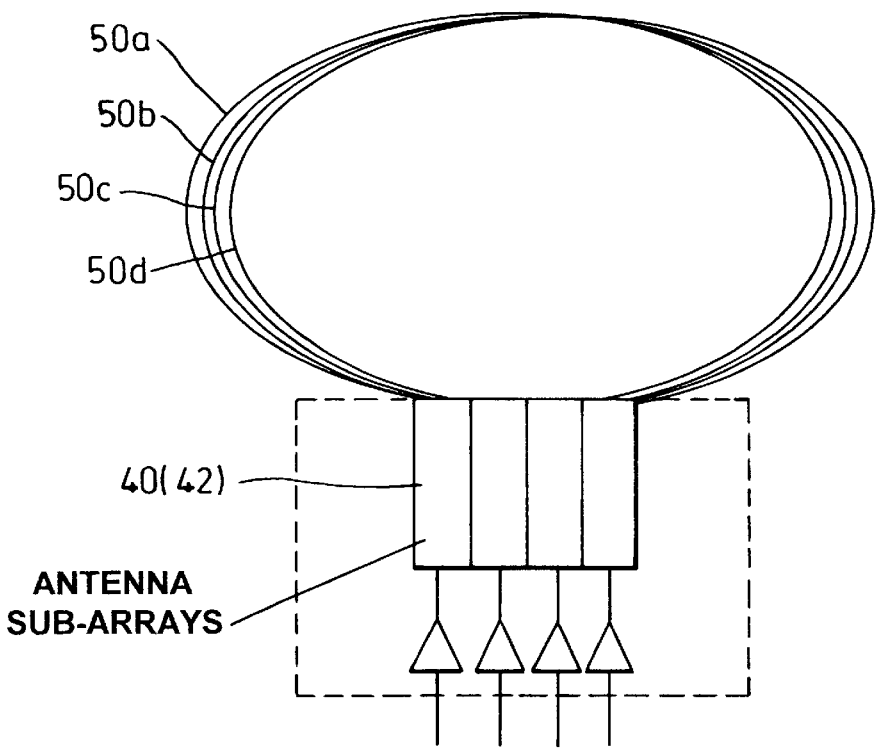
FIG. 4 is a diagram showing the formation of a multiplicity of separate substantially coincident beams in azimuth from a multiple sub-array antenna.

For medium to low transceiver capacity there is no longer a requirement for combiners. FIG. 4 shows how the use of separately amplified sub-arrays 40,42 provides a substantially coincident combination of beams in space 50a–d. Physical combiners have an inherent loss associated with them; the theoretical loss incurred by including a four way combiner is 6dB. Spatial combining by comparison is a relatively lossless technique. In current systems the amplifiers would also be situated at the base of the mast, hence extra loss would also be incurred in the cabling required to the antenna array. Utilising single carrier amplifiers for transmission and moving the amplifiers to the masthead, thereby removing the need for lossy combiners, enables a higher EIRP to be achieved. This increases the range and, in dense urban areas, building penetration of the system because in a conventional arrangement, power is lost in the combiner.

The use of spatial combining also means that each column of the array only has a single carrier present at any one time in the transmit mode. That is to say, on the downlink, one transmit path per time slot is allocated to each sub-array This is beneficial in that fewer intermodulation products are generated and the power requirements are reduced for the same output as a conventional scheme. In the event of a mains power failure, this feature would be particularly significant, since the batteries provided for such circumstances will remain operational for a longer period. In a conventional combiner system the antenna elements must be capable of handling the combined power of all the amplifiers affecting both the mean and peak power ratings of the antenna. In the present invention each sub-array has only to be capable of handling the power from one amplifier and thus power losses due to the use of combiners are absent. For the example shown in FIG. 4 the mean power rating would be reduced by a factor of 4. The combination of features of the invention allows a higher EIRP to be achieved, improving the downlink to mobiles, whilst utilising cheaper antenna construction techniques and improving the reliability. In order to provide spatially combined signals, then several signals along different transmit paths are employed from the sub-arrays. Conventionally, the signals from several transmitters are combined prior to being fed to the antenna or antenna array with the use of a physical combiner.

The invention can be realised by several separate column or arrays to achieve spatial diversity, however, the use of multiple linear arrays could cause aesthetic and structural problems if physically independent arrays were to be used. This potential problem is overcome in a preferred embodiment by combining all the sub-arrays for a single array into one physical structure with one radome and diplexing transmit and receive through a common aperture. Typically, an antenna array comprises 4 columnar sub-arrays housed in a 2 m high by 0.8 m wide enclosure or radome. More sub-arrays can be provided, but a balance needs to be maintained between the use of aesthetically pleasing arrangements and the system requirements. Note that the antennas need not be provided by transceivers and may be dedicated to the up-and-down links as appropriate; for instance, the downlink could be provided by a separate omni-directional antenna. In this way the outline of the antenna, for reasonable beamwidth, is less than that of many conventional cell sites. For cells requiring omni-directional coverage in azimuth three or four arrays as described above can be mounted in juxtaposition with regular angular orientation about a common support means.

The number of sub-arrays employed need not primarily be provided to allow a corresponding number of signals to be transmitted, but rather that uplink signals from low power mobile stations can provide stronger received signals at the base station. New technologies such as digital signal processing are used in conjunction with combiner algorithms, whereas switch type algorithms have previously been used.

With the use of an optimal combiner (see GB-9421538.1), antennas can be placed close together whilst still achieving diversity or gain rather than having the sub-arrays/further antenna being placed e.g. 50 wavelengths apart. Thus a compact antenna structure can be provided. In a compact antenna structure, the uplink does not rely on the correlation between the elements and adaptive beamforming is employed.

We claim:

1. An azimuthal beamforming antenna arrangement for a cellular radio base station for receiving uplink signals from and transmitting downlink signals to outstations within an area of coverage of the base station, comprising at least one antenna including several vertically oriented sub-array antennas, the vertically oriented sub-array antennas including means for forming separate substantially coincident beams in azimuth; switching means operable to select any one or more of the vertically oriented sub-array antennas; wherein several vertically oriented sub-array antennas are selectively switchable so that the uplink signals are received by at least two vertically oriented sub-array antennas coupled through cables by respective elevation beamformers to a base station controller.

2. an antenna arrangement according to claim 1 wherein the downlink is carried by at least one vertically oriented sub-array antenna, each vertically oriented sub-array antenna being coupled to the base station controller by respective elevation beamformers.

3. An antenna arrangement according to claim 1 wherein each vertically oriented sub-array antenna is coupled to a respective transmit and receive amplifying means by diplexer means.

4. An antenna arrangement according to claim 1 wherein separate vertically oriented sub-array antennas are utilised for uplink and downlink communications respectively, and individual amplifying means are provided for each vertically oriented sub-array antenna providing downlink communications, the amplifying means comprising a number of low power single carrier amplifiers distributed in the vertically oriented sub-array antenna elevation beamforming means.

5. An azimuthal beamforming antenna arrangement for a cellular radio base station comprising a plurality of r.f transceivers each for transmitting and receiving r.f signals to and from the antenna via respective transmit and receive feed means for one or more calls, the arrangement including one or more antenna arrays wherein each array comprises a plurality of vertically oriented sub-array antennas, each including means for forming a beam in azimuth; switching means operable to select any one or more of the vertically oriented sub-array antennas; wherein several vertically oriented sub-array antennas are selectively switchable; elevation beamforming means for each vertically oriented sub-array antenna and individual transmit and receive amplifying means for each vertically oriented sub-array antenna, wherein each vertically oriented sub-array antenna beamforming means is selectively coupled to at least one r.f transmitter feed means and each r.f receiver feed means is selectively coupled to at least two vertically oriented sub-array antenna beamforming means, the vertically oriented sub-array antennas of each antenna array together forming a multiplicity of separate substantially coincident beams in azimuth.

6. An antenna arrangement according to claim 5 wherein each vertically oriented sub-array antenna is coupled to a respective transmit and receive amplifying means by diplexer means.

7. An antenna arrangement according to claim 5 wherein the plurality of vertically oriented sub-array antennas comprises pairs of separate vertically oriented sub-array antennas for transmission and reception respectively, the individual amplifying means for each transmit vertically oriented sub-array antenna comprising a number of low power single carrier amplifiers distributed in branches of vertically oriented sub-array antenna elevation beamforming means.

8. An antenna arrangement according to claim 5 wherein a plurality of arrays is arranged in juxtaposition with a regular angular orientation about a common support structure.

9. A method of operating an azimuthal beamforming antenna arrangement for a cellular radio base station in a receive mode, wherein the base station comprises at least one antenna array including several vertically oriented sub-array antennas each for selectively forming a beam in azimuth, the vertically oriented sub-array antennas capable of forming separate substantially coincident beams in azimuth, wherein the method comprises the step of receiving radio signals from mobile transmitters using at least two vertically oriented sub-array antennas coupled to the base station controller, feeding the signals to single carrier amplifiers whereby a plurality of diverse receive paths can be obtained directly from the antenna array.

10. A method of operating an azimuthal beamforming antenna arrangement for a cellular radio base station in a transmit mode, wherein the base station comprises at least one antenna array including several vertically oriented sub-array antennas, each including means for forming a beam in azimuth; switching means operable to select any one or more of the antenna sub-arrays; wherein several vertically oriented sub-array antennas are selectively switchable; wherein the downlink signals are transmitted by at least one sub-array coupled to a base station controller by respective elevation beamformers, the method comprising the steps of i) providing a signal to be transmitted by a base station control means to an r.f. generator to produce an r.f. signal; ii) transmitting said r.f. signal via a feed to a selected transmit amplifier; iii) transmitting said r.f. signal via a feed to a beamforming means; and iv) feeding radiating elements of at least one vertically oriented sub-array antenna.

* * * * *